R. A. FESSENDEN.
DETECTING AND LOCATING SHIPS.
APPLICATION FILED APR. 20, 1917.
1,319,145.
Patented Oct. 21, 1919.
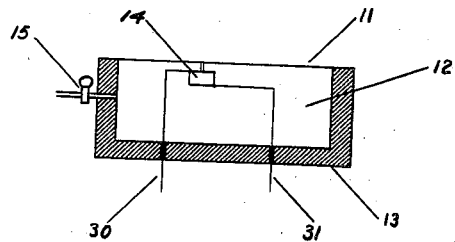
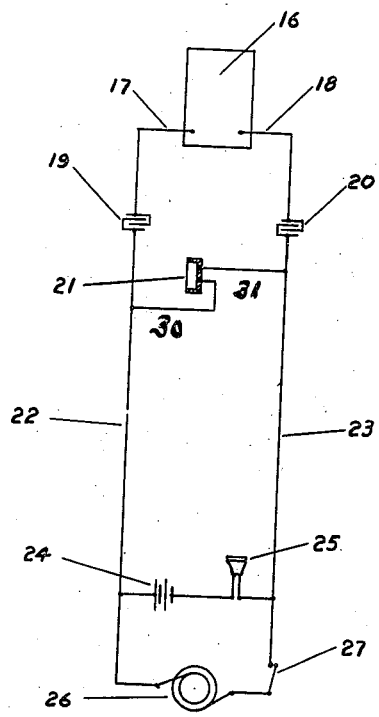
INVENTOR.
Reginald A. Fessenden
BY
ATTORNEY.

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

DETECTING AND LOCATING SHIPS.

1,319,145.  Specification of Letters Patent.  Patented Oct. 21, 1919.

Application filed April 20, 1917. Serial No. 163,505.

*To all whom it may concern:*

Be it known that I, REGINALD A. FESSENDEN, of Brookline, in the county of Norfolk and State of Massachusetts, a citizen of the United States, have invented a new and useful Improvement in Detecting and Locating Ships, of which the following is a specification.

My invention relates to the detection and location of ships and other marine bodies and more especially to determining when an approaching ship is located over a mine and in such a position that it will be exploded if the mine or other destructive engine is exploded.

Figures 1 and 2 show diagrammatically apparatus adapted to carry out my invention.

The object of my invention is to distinguish and locate ships and other marine bodies and to determine when such ships and other marine bodies are in such position relative to mines and other destructive engines that they will be destroyed when the mine is exploded.

I have discovered, as stated in United States application, Serial No. 158,457, filed March 29, 1917, that submarines and other marine vessels give off in motion very intense waves but of so low a frequency as to be audible with difficulty. I have also discovered (see United States application, Serial No. 151,611, filed February 28, 1917), that the sensibility of a diaphragm to such waves depends more on its diameter than on its thickness and that the response of large diaphragms to such low frequency waves is very much more intense than that of small diaphragms, and I have found that a microphone, or other indicating mechanism, attached to such a large diaphragm will give indications where a small diaphragm, even though much thinner, will not respond at all.

I have also found that it is possible to connect up such large diaphragm indicators to mines and similar destructive engines in such a way that the ship may be heard and the exact instant at which the ship is over the mine may be determined, and by the depression of a key the mine may be exploded and the ship destroyed.

I have also found that the same pair of conductors may be used for both purposes, i. e., for listening in on the detecting mechanism and for exploding the mine.

In Fig. 1, 11 is a diaphragm of large size having an area of a different and larger order of magnitude than the exposed area of the ordinary transmitter. 14 is an inertia carbon button attached to the diaphragm 11 and preferably off-center so as to be less responsive to high pitch noises, the diaphragm itself being of such thickness that in conjunction with its large diameter it is more sensitive to vibrations of low frequency of the order of one vibration per second. 13 is the back of the transmitter, preferably made of iron or lead, and stiff. 12 is the space between the diaphragm 11 and the back 13 and is preferably filled with air through the cock 15 so that the pressure of the air in the space 12 is the same as the pressure on the outside of the transmitter when the diaphragm is immersed to its desired depth, the diaphragm 11 being thereby maintained in a flat position. 30, 31 are the leads to the microphone.

Fig. 2 shows a suitable arrangement of circuits for operating this device. Here 16 is a mine; 17 and 18 are the terminals of the firing conductors 22 and 23. 19 and 20 are condensers placed in series with the conductors 22 and 23 so as to admit of the passage of an alternating current but not of a continuous current. 26 is an alternating current dynamo and 27 is a key.

On pressing the key 27 alternating current from the dynamo 26 flows through the condensers 19 and 20 into the mine 16 and explodes the mine.

21 is a transmitter of the type shown in Fig. 1; 24 is a battery or other direct current generator, and 25 is a telephone receiver.

On listening into the receiver, if a ship is approaching, i. e., about .06 miles a second, the low frequency waves generated by the motion of the ship will affect the diaphragm 21 and sounds traveling through the water at about the rate of a mile a second will be heard, indicating the presence of the ship. As these sounds increase it will be known that the ship is appoaching and when the sounds are most intense or of such intensity as, determined by practice and experiments, to indicate that the ship is directly over the mine, the key 27 is pressed and the mine exploded.

In practice it is found that the instant when the sound ceases to increase and begins to decrease can be told with great accuracy. In an official test made in Boston Harbor by the U. S. Navy in September, 1917, the listening operator was placed in a windowless booth and was instructed to give a signal by pressing a key at the instant when the sound made by a moving vessel ceased to increase and began to decrease. At the same time the moving vessel was instructed to make a non-audible signal at the instant when it was directly over the sound-receiving apparatus. From the results of these tests and as stated in the official reports, it was found possible to locate the exact instant of the passage of the middle of the vessel over the sound-receiving apparatus with an average error of not over 15 feet. As the range of a mine is more than 50 feet and as errors of 75 to 100 feet would be allowable, depending on the size of the vessel, the accuracy of the method was found on actual official test to be much in excess of that required.

The method shown in Fig. 2 may be modified by making a continuous current circuit operate the firing mechanism and an alternating current operate the indicating mechanism.

Other modifications to effect the desired result will occur to those skilled in the art.

What I claim as my invention is:—

1. The combination of a mine, a normally-open firing circuit therefor and means for closing it, an indicating mechanism and a receiving mechanism, a closed circuit for said indicating mechanism and receiving mechanism, said circuits having parts in common, the closing means of said firing circuit being independent of said receiving and indicating circuit, and means also located in said firing circuit whereby the operation of said indicating and receiving circuit will be independent of the operation of said firing circuit.

2. In combination, a mine, a normally-open firing circuit therefor comprising a generator, a circuit closer and a connection between said mine, said generator and said circuit closer and a closed listening circuit comprising a direct current source, a receiving means and a listening means, and connections between said listening circuit and said firing circuit whereby a portion of said firing circuit shall serve as a portion of said listening circuit, and means whereby the current from said direct current source shall be blocked from the firing circuit.

3. In combination, a mine, a normally-open firing circuit therefor comprising an alternating generator and a circuit closer and connections between said mine, said generator and said circuit closer, and a closed listening circuit comprising a direct current source and telephone receiver and a receiving mechanism, a bridge circuit comprising said direct current source and telephone receiver and a second bridge circuit comprising a receiving means, said bridge circuits connecting portions of said firing circuit in parallel, and condensers located in said firing circuit between said mine and the bridge containing said receiving means.

REGINALD A. FESSENDEN.